United States Patent [19]
Fujiki et al.

[11] Patent Number: 5,352,724
[45] Date of Patent: Oct. 4, 1994

[54] SILICONE RUBBER COMPOSITION WITH IMPROVED FLUIDITY

[75] Inventors: Hironao Fujiki, Takasaki; Masayuki Ikeno, Maebashi; Masaya Arakawa, Annaka; Kaoru Michimata, Takasaki; Masanobu Miyakoshi; Takehide Okami, both of Annaka, all of Japan

[73] Assignee: Shin-Etsu Chemical Co., Ltd., Tokyo, Japan

[21] Appl. No.: 91,298

[22] Filed: Jul. 15, 1993

[30] Foreign Application Priority Data

Jul. 16, 1992 [JP] Japan ................. 4-212150
Jul. 16, 1992 [JP] Japan ................. 4-212151

[51] Int. Cl.$^5$ ............................................. C08K 5/56
[52] U.S. Cl. ................................. 524/398; 524/493; 524/437; 524/862; 524/847; 524/786; 524/588; 524/783; 524/837
[58] Field of Search ............... 524/493, 437, 862, 847, 524/786, 588, 398, 783, 837

[56] References Cited

U.S. PATENT DOCUMENTS

| | | | |
|---|---|---|---|
| 4,496,469 | 1/1985 | Morimoto et al. | 524/588 |
| 4,696,970 | 9/1987 | Sumimura et al. | 524/588 |
| 4,806,592 | 2/1989 | Saruyama | 524/860 |
| 4,824,903 | 4/1989 | Aizawa et al. | 524/772 |
| 5,064,891 | 11/1991 | Fujiki et al. | 524/264 |
| 5,204,437 | 4/1993 | Ikeno et al. | 528/15 |

FOREIGN PATENT DOCUMENTS

| | | |
|---|---|---|
| 0231519 | 8/1987 | European Pat. Off. . |
| 0273706 | 7/1988 | European Pat. Off. . |
| 0319828 | 6/1989 | European Pat. Off. . |
| 2383213 | 10/1978 | France . |

*Primary Examiner*—Melvyn I. Marquis
*Assistant Examiner*—Karen A. Dean
*Attorney, Agent, or Firm*—Oblon, Spivak, McClelland, Maier & Neustadt

[57] ABSTRACT

An addition-curable type silicone rubber composition comprising (A) an organopolysiloxane having an alkenyl group such as vinyl in its molecule, (B) an organohydrogenpolysiloxane having at least two SiH groups in its molecule, (C) a platinum catalyst such as platinum, chloroplatinic acid, etc., (D) an inorganic filler, (E) an organic titanium compound such as tetraethyl titanate, and (F) water. The composition exhibits good fluidity, and behaves like a Newtonian fluid, even where carbon black or a silica or alumina having an average particle diameter of 1 $\mu$m or above is incorporated in the composition as an inorganic filler for improving such characteristics as heat resistance, thermal conductivity, etc.

11 Claims, No Drawings

SILICONE RUBBER COMPOSITION WITH IMPROVED FLUIDITY

BACKGROUND OF THE INVENTION

1. Field of the Invention

The present invention relates to an addition-curable type silicone rubber composition, and more particularly to a silicone rubber composition with improved fluidity.

2. Description of the Prior Art

Addition-curable type silicone rubber compositions are in extensive use for such applications as electrically insulating potting material, PPC roll material, etc. These compositions generally comprise an alkenyl group-containing organopolysiloxane, an organohydrogen-polysiloxane containing an SiH group, a platinum catalyst and an inorganic filler. Specifically, for obtaining enhanced heat resistance, carbon black is used as an inorganic filler; for such purposes as improving thermal conductivity or preventing deformation of cured products due to thermal expansion, a silica or alumina having an average particle diameter of 1 $\mu$m or above is used as an inorganic filler.

However, incorporation of carbon black into an addition-curable type silicone rubber composition markedly impairs the fluidity of the composition. In order to solve the problem, it has been proposed to use a carbon black of which particle surfaces have been treated with water and a hexaalkylsilazane (See Japanese Preexamination Patent Publication (KOKAI) No. 2-80461 (1990)). According to the proposed method, however, improvement of fluidity is not achievable, though the resulting silicone rubber compositions tend to show a lowered viscosity.

On the other hand, use of a silica or alumina having an average particle diameter of 1 $\mu$m or above as an inorganic filler results in that the filler separates from silicone oil and sediments during storage of the silicone rubber composition. It is known that the separation and sedimentation can be prevented by addition to the composition of fumed silica having a specific surface area of 50 m$^2$/g or above. The addition of such fumed silica, however, involves the problem that fluidity of the composition is lowered. As a means for overcoming the above drawbacks and obtaining an addition-curable silicone rubber composition improved in thermal conductivity and other properties, Japanese Patent Publication (KOKOKU) No. 52-22965 (1977), for example, discloses a process which comprises using a filler such as alumina, magnesium oxide or the like and treating the filler-loaded curable composition with water and a silazane compound. However, such a treatment requires a heating step, and, in addition, another heating step is needed to remove excess portions of the water and silazane compound from the reaction system. Thus the process is disadvantageous from the viewpoint of productivity and cost.

SUMMARY OF THE INVENTION

It is accordingly an object of the present invention to provide a silicone rubber composition which has an effectively improved fluidity and which is excellent in such properties as heat resistance, thermal conductivity or the like.

In order to attain the above object, the present invention provides a silicone rubber composition comprising:

(A) an alkenyl group-containing organopolysiloxane, (B) an organohydrogenpolysiloxane having at least two silicon-bonded hydrogen atoms in its molecule, (C) a platinum group metal catalyst, (D) an inorganic filler, (E) an organic titanium compound, and (F) water, wherein said organohydrogenpolysiloxane (B) is compounded in an amount such that the amount of said silicon-bonded hydrogen atoms is from 0.4 to 5.0 moles per mole of alkenyl groups in said organopolysiloxane (A).

Namely, according to the present invention, an organic titanium compound and water are incorporated into a silicone rubber composition, thereby successfully improving fluidity of the composition. Consequently, carbon black or a silica or the like having an average particle diameter of 1 $\mu$m or above can be effectively used as an inorganic filler in the composition, without needing any special treatment, to improve heat resistance, thermal conductivity, etc. of the composition or to satisfactorily prevent cured products of the composition from being deformed due to thermal expansion.

DETAILED DESCRIPTION OF PREFERRED EMBODIMENTS (A) Alkenyl Group-Containing Organopolysiloxane The component (A) is an ingredient which has been conventionally used as a base component in addition-curable type silicone rubber compositions. Normally, the component (A) includes, for example, organopolysiloxanes having the following average composition formula (1):

$$R_aSiO_{(4-a)/2} \tag{1}$$

wherein R may be the same or different and are each a silicon-bonded organic group, and a is a number of from 1.9 to 2.4.

In the above formula (1), the R groups include, for example, alkyl groups such as methyl, ethyl, propyl, butyl and the like; cycloalkyl groups such as cyclohexyl and the like; alkenyl groups such as vinyl, allyl, butenyl and the like; aryl groups such as phenyl, xylyl and the like; aralkyl groups such as benzyl, phenylethyl and the like; and groups derived from these groups by substitution of part or all of the hydrogen atoms in these groups by a halogen atom or the like, for example, chloromethyl, 3,3,3-trifluoropropyl and the like, provided at least one of the R groups is alkenyl. The alkenyl group may be located either at a terminal end or at an intermediate position of the molecular chain of the organopolysiloxane.

Among the alkenyl groups applicable as R in the formula (1), preferred is the vinyl group; on the other hand, preferable R groups other than alkenyl are methyl and ethyl groups.

The organopolysiloxane as above may have a linear molecular structure or a branched structure comprising RSiO$_{3/2}$ units or SiO$_{4/2}$ units. Besides, it is preferable that the organopolysiloxane has a viscosity of from 100 to 100,000 cP at 25° C., in order to ensure good processability and obtain a cured product with excellent physical properties.

Typical examples of the alkenyl group-containing organopolysiloxane as above include the followings:

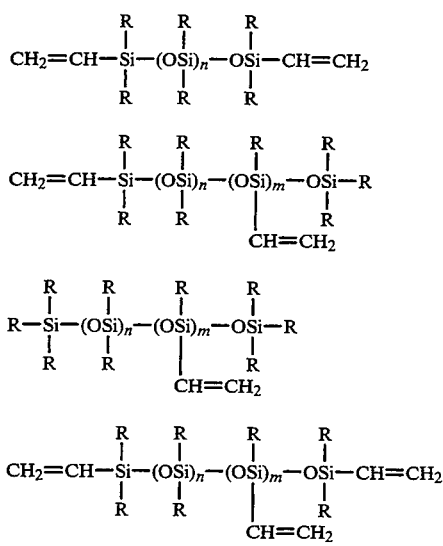

wherein R is as defined above, and m and n are each a positive integer.

The organopolysiloxanes as above-described can be prepared by methods which are known per se. For instance, an organocyclopolysiloxane and a hexaorganodisiloxane are brought into equilibration reaction in the presence of an alkali or acid catalyst, whereby a desired organopolysiloxane can be easily obtained.

(B) Organohydrogenpolysiloxane

The organohydrogenpolysiloxane as component (B), which serves as a crosslinking agent, has at least two silicon-bonded hydrogen atoms in its molecule. That is, the SiH groups in the organohydrogenpolysiloxane and the alkenyl group in the above organopolysiloxane (A) perform an addition reaction (hydrosilation), whereby a rubber-like elastic cured product is formed.

The organohydrogenpolysiloxane also is well known in the art, like the component (A) above, and is not restricted in molecular structure or the like. For instance, the organohydrogenpolysiloxane may have any of linear, cyclic and branched structures, and the silicon-bonded hydrogen atoms may be located at any position in the molecule.

Generally, the organohydrogenpolysiloxanes can be prepared by a method in which an octamethylcyclotetrasiloxane and/or tetramethylcyclotetrasiloxane and a silicon compound containing a hexamethyldisiloxane or 1,3-dihydro-1,1,3,3-tetramethyldisiloxane unit capable of forming terminal groups are equilibrated in the presence of a catalyst such as sulfuric acid, trifluoromethane-sulfonic acid, methanesulfonic acid, etc. at a temperature of from $-10°$ C. to $40°$ C.

In the present invention, the component (B) is used in an amount such that the amount of its silicon-bonded hydrogen atoms is from 0.4 to 5.0 moles, preferably from 0.8 to 2.0 moles, per mole of alkenyl groups in the component (A). If the amount of the component (B) is below the range, cured products of the composition obtained have a low crosslink density, which may produce an adverse effect on heat resistance. If the amount is above the range, on the other hand, the problem of foaming due to dehydrogenation reaction may arise and bad effects on properties of the composition may also be produced.

(C) Platinum Group Metal Catalyst

The component (C) is a catalyst for accelerating the hydrosilation between the components (A) and (B) to produce a cured product rapidly. The catalysts which can be used include those based on platinum, palladium or rhodium, and platinum-based ones are normally used. For example, platinum black, chloroplatinic acid, alcohol-modified chloroplatinic acids, and complexes of chloroplatinic acid with olefin, aldehyde, vinylsiloxane, acetylene alcohol or the like can be used suitably.

The amount of the component (C) may be selected according to the curing rate desired, and normally ranges from 0.1 to 1000 ppm, preferably from 1 to 200 ppm, in terms of catalyst metallic element, based on the amount of the component (A).

(D) Inorganic Filler

In the composition of the present invention, carbon black or a silica or alumina having an average particle diameter of 1 $\mu$m or above, specifically from 5 to 50 $\mu$m, is preferably used as inorganic filler. Although other inorganic fillers than carbon black or the silica or alumina can also be used, where such other inorganic fillers are used the merit of the present invention is not displayed positively because their use is originally free of the problem of lowering in fluidity.

As has been described above, carbon black is used for improving heat resistance. In general, carbon blacks are classified by preparation method into furnace black, channel black, acetylene black, thermal black and so forth. Among the carbon blacks, acetylene black is particularly preferred for use in the present invention. That is, other carbon blacks than acetylene black usually contain large amounts of sulfur, amines and the like, by which curing of the composition will be hindered. However, the carbon blacks other than acetylene black which have been lowered in contents of sulfur, amines and the like by a suitable treatment can be effectively used in the present invention. In the present invention, besides, it is preferable to use a carbon black having a BET specific surface area of 10 m$^2$/g, in view of physical reinforcing effects, particularly suitable carbon blacks for use in the present invention are commercially available, for example, from Denki Kagaku Kogyo K.K. under the tradename "Denka Black", from Lion Corp. under the tradename "Ketjen Black EC", and so on.

According to the present invention, the carbon black as above-described is preferably used in an amount of from 5 to 50 parts by weight, more preferably from 10 to 30 parts by weight, per 100 parts by weight of the component (A). If the amount is less than 5 parts by weight, improving effects on heat resistance, mechanical strength and the like are not developed satisfactorily. Where the amount exceeds 50 parts by weight, on the other hand, the resulting composition is liable to have poor fluidity, low suitability to practical use, and the like problems, though sufficient improvements are attainable as to reinforcement and heat resistance.

In the present invention, further, for the purpose of improving thermal conductivity or preventing deformation of cured products due to thermal expansion, namely, for lowering coefficient of thermal expansion, a silica or alumina with a large average particle diameter as described above is used, aside from or along with the above-described carbon black. If the average particle diameter of the silica or alumina is less than 1 $\mu$m, the desired effect in improving thermal conductivity and lowering coefficient of thermal expansion cannot be expected.

As the silica or alumina, any desired silica or alumina can be used provided its average particle diameter is in the above-specified range. For example, those ones conventionally used as fillers in silicone rubber compositions, such as crystalline silica, amorphous silica, fused silica, diatomaceous earth, ground glass, alumina and so forth can be used, singly or in combination of two or more. Also, the shape of particles of the silica or alumina is not particularly restricted, and may be acicular, indefinite (irregular), whisker-like, spherical or the like.

In the present invention, where the silica or alumina as above is used, a fumed silica or precipitated silica having a specific surface area of 50 $m^2/g$ or above (hereinafter referred to also as "particulate silica") should be used along with said silica or alumina. That is, if the above-described silica or alumina is used singly (without being accompanied by the particulate silica), the silica or alumina will separate from the silicone components (A) and (B) and will sediment, rendering the composition unsuited to practical use. As the particulate silica, those reinforcing silicas used in ordinary silicone rubber compositions can be used, which are either hydrophilic or hydrophobic. Hydrophilic reinforcing silicas include, for example, those products commercially available under the respective tradenames of Aerosil 130, 200 and 300 (produced by Nippon Aerosil Co., Ltd., and Degussa), Cabosil MS-5 and MS-7 (produced by Cabot), Rheorosil QS-102 and 103 (produced by Tokuyama Soda Co., Ltd.), Nipsil LP (produced by Nippon Silica Co., Ltd.) and so on. Hydrophobic reinforcing silicas include, for example, those commercial products with tradenames of Aerosil R-812, R-812S, R-972 and R-974 (produced by Degussa), Rheorosil MT-10 (produced by Tokuyama Soda Co., Ltd.), Nipsil SS Series (produced by Nippon Silica Co., Ltd.) and so on.

These particulate silicas are normally used in an amount of up to 20% by weight, preferably from 1 to 10% by weight, based on the total amount of the silica or alumina which has an average particle diameter of 1 $\mu m$ or above and which is used in combination with the particulate silica. Where the particulate silica is used in an amount greater than 20% by weight, fluidity of the silicone rubber composition cannot be improved, and it is impossible to use the above-described silica or alumina with an average particle diameter of 1 $\mu m$ or above in an increased amount.

In the present invention, the silica or alumina having the larger average particle diameter and the particulate silica are preferably used in amounts such that their total amount is from 10 to 500 parts by weight, more preferably from 50 to 300 parts by weight, per 100 parts by weight of the alkenyl group-containing organopolysiloxane of component (A). If the total amount is less than 10 parts by weight, improvement of thermal conductivity and the like is not attainable, whereas if the amount exceeds 500 parts by weight, fluidity of the silicone rubber composition is impaired and it is difficult practically to use the composition as a potting material or the like.

(E) Organic Titanium Compound

The organic titanium compound of component (E) serves for improvement in fluidity of the silicone rubber composition. The reason why the fluidity of the composition is improved by use of the component (E) has not yet been elucidated completely. It is probable, however, that the component (E) in cooperation with water of component (F) (which will be described later) gives an effective surface treatment to the particles of the above-described carbon black or particulate silica, thereby resulting in a remarkable improvement in the fluidity of the composition.

The organic titanium compounds which can be used as component (E) include, for example, titanic esters such as tetraethyl titanate, tetraisopropyl titanate, tetra-n-butyl titanate, butyl titanate dimer, tetra(2-ethylhexyl) titanate, titanium octyl glycolate, titanium lactate, titanium lactate ethyl ester, and partial hydrolyzates thereof; partially alkoxylated chelate compounds of titanium; titanium chelate compounds; silicic esters titanium and chelate compounds thereof, and so on.

The amount of the component (E) to be used varies depending on the kind and amount of the inorganic filler (D), but is normally in the range from 0.001 to 5 parts by weight per 100 parts by weight of the component (A). Particularly where carbon black is used as inorganic filler (D), a preferable amount for the component (E) is from 0.01 to 5 parts by weight, the most preferable amount ranging from 0.05 to 2 parts by weight. Where the silica or alumina with an average particle diameter of 1 $\mu m$ or above is used as inorganic filler (D), the preferable amount for the component (E) is from 0.005 to 1 parts by weight. If the amount of the component (E) is below the just-specified range, the composition obtained is unsatisfactory in fluidity. On the other hand, use of the component (E) in amounts above the range does not produce any further effects, and, rather, is disadvantageous economically.

(F) Water

The water as component (F) in the composition of the present invention, by being used together with the organic titanium compound of component (E), contributes to improvement in fluidity of the composition. The contribution of the water to improving the fluidity of the composition, according to the present invention, is evidenced by the fact as follows. When the above-described components (A) to (E) were mixed in a stream of nitrogen by using a hermetically sealed mixer-stirrer, the resulting mixture did not show fluidity. When the mixture thus obtained was then exposed to the atmosphere, it gradually became fluid and, surprisingly, it finally came to behave like a Newtonian fluid (that is, the viscosity of the mixture varied little with variations in shearing rate). A similar mixture with very good fluidity was obtained also when the components (A) to (E) were mixed together under a positive addition of water. Development of such a fluidity indicates that the composition according to the present invention has an excellent ability to penetrate into minute gaps, which is a great advantage in practical use. Such a composition with excellent fluidity as this is of great use, for example, as a potting material or as an adhesive for filling up a gap.

In the present invention, the action of water as described above is not yet made clear. It is considered that the water causes hydrolysis of the organic titanium compound, and a surface treatment of the particles of carbon black and the like is thereby performed rapidly, resulting in a marked improvement in the fluidity of the composition. Incidentally, it is clearly shown in Journal of the Adhesion Society of Japan, vol. 27, No. 8 (1991), p. 18, that organic titanium compounds are not necessarily effective as a treating agent for carbon black. The description demonstrates how surprising the fluidity-improving effect obtained according to the present invention is.

Normally, the water as component (F) is preferably used in an amount of from 0.1 to 5% by weight based on the amount of the inorganic filler of component (D). If the amount of the component (F) exceeds 5% by weight, foaming or the like may occur during cure of the silicone rubber composition, whereas water amounts less than 0.1% by weight make it difficult to obtain satisfactory fluidity.

The amount of water in the above-specified range can be satisfactorily supplied by simply exposing the composition to air. Therefore, the water as component (F) may not necessarily be supplied by positive addition of water in preparing the composition of the present invention; the water can be supplied by mixing the components (A) to (E) under exposure to the atmospheric air or by mixing the components (A) to (E) and then exposing the resulting composition to the atmospheric air. Besides, the carbon black, silica or the like as component (D) may also contain around 0.1% by weight of water. In such a situation, it is unnecessary to expose intentionally the composition to the atmospheric air.

Other Components

Into the composition according to the present invention, in addition to the essential components (A) to (F) above, various compounding ingredients can be incorporated within such ranges as not to impair the effects of the present invention.

For instance, where carbon black is used as inorganic filler (D), it is preferable to add to the composition an orgnaosilicon compound containing a silicon-bonded alkoxyl group. The compound contributes to early development of fluidity of the composition. Namely, an addition of the organosilicon compound causes the surface treatment of carbon black particles to be performed more efficiently and rapidly, whereby productivity for the composition of the present invention is markedly enhanced, which is highly advantageous economically.

The alkoxyl group-containing organosilicon compound may be any one of those containing at least one silicon-bonded alkoxyl group in the molecule thereof. Typical examples of the alkoxyl group-containing organosilicon compound include silane compounds having the following general formula (2):

$$R^1{}_{4-q}-Si-(OR^2)_q \qquad (2)$$

wherein $R^1$ is a substituted or unsubstituted monovalent hydrocarbon group, $R^2$ is an alkyl group or a halogenated alkyl group, and q is an integer from 1 to 4, and hydrolyzates thereof.

As $R^1$ in the general formula (2), any monovalent hydrocarbon group, whether substituted or unsubstituted, can be used as desired. Normally, however, amine- or sulfur-containing groups should be avoided, because they hinder the catalytic action of the component (C), possibly leading to unsatisfactory cure or the like.

Specifically, the silane compounds represented by the above general formula (2) include, for example, vinyltrimethoxysilane, phenyltrimethoxysilane, vinyltriethoxysilane, tetraethoxysilane, tetramethoxysilane, tetra(n-propoxy)silane, methyltris(propenoxy)silane, vinyltris(propenoxy)silane, phenyltris(1-methoxy-2-methylpropenoxy)silane, dimethyldimethoxysilane, glycidyloxypropyltrimethoxysilane, acryloxypropyltrimethoxysilane, methacryloxypropyltrimethoxysilane, and so forth.

Besides the silane compounds of the general formula (2) and hydrolyzates thereof, there can also be used, for example, the following siloxane compounds:

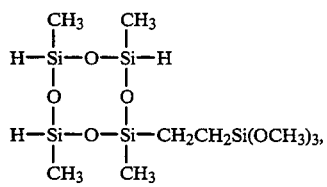

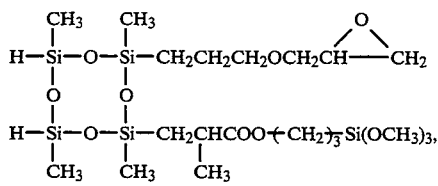

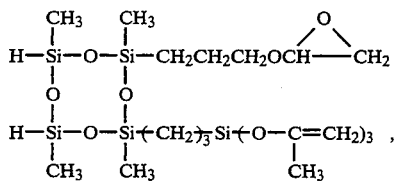

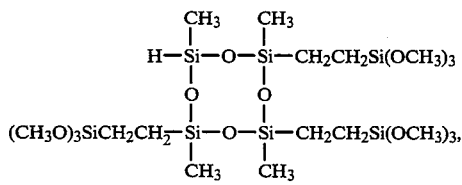

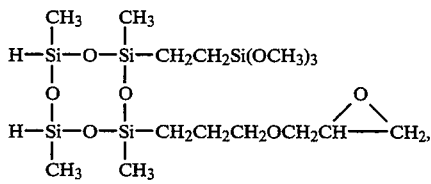

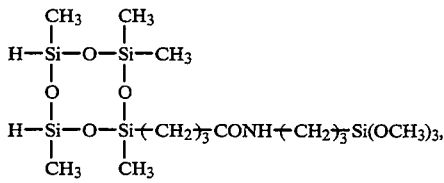

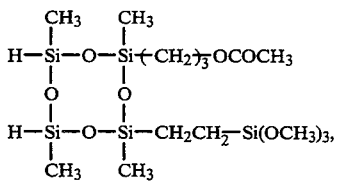

-continued

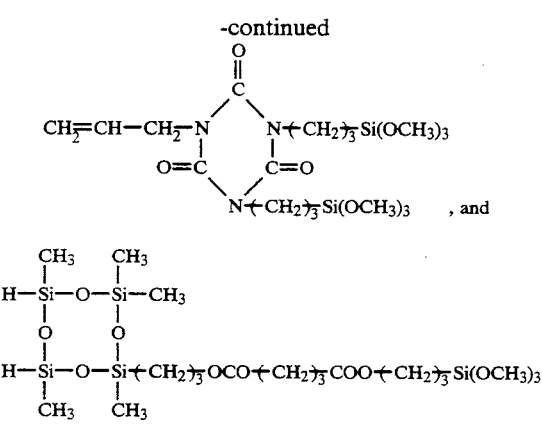
, and

In the present invention, these alkoxyl group-containing organosilicon compounds are preferably used in an amount of up to 10 parts by weight per 100 parts by weight of the organopolysiloxane of component (A).

In addition, regardless of the kind of the inorganic filler (D), an adhesive agent can be compounded in the composition of the present invention, as in ordinary addition-curable type silicone rubber compositions, to thereby improve adhesion of the resulting cured product to various adherends. Such adhesive agents are known per and include, for example, silicon compounds which contain an addition-curing type functional group such as SiH and alkenyl groups, etc. and an adhesive functional group such as alkoxysilyl, glycidyl, acid anhydride groups, peroxysilyl, isocyanate group, etc.

Besides, where control of curing time is needed in using the composition of the present invention, a controlling agent may be used. The applicable controlling agents include, for example, vinyl group-containing organopolysiloxanes such as vinylcyclotetrasiloxane, etc., triallyl isocyanurate, alkyl maleates, acetylene alcohol and silane- or siloxane-modified products thereof, hydroperoxides, tetramethylenediamine, benzotriazole and so forth, which may be used either singly or in combination of two or more.

Furthermore, heat-resisting additives such as red iron oxide, cerium hydroxide, cerium oxide, zirconium compounds, etc., organic and inorganic coloring pigments or dyes, and so on can also be added to the composition the present invention.

Curable Composition

The composition according to the present invention can be prepared by kneading the above-described components. The kneading may be carried out at normal temperature. That is, the kneading does not require a step of heating at 100° to 200° C., which is necessary for preparing, for example, a composition needing a treatment with water and a hexaalkylsilazane (See Japanese Preexamination Patent Publication (KOKAI) No. 2-80461 (1990)). Thus the composition of the present invention is highly advantageous in view of productivity also.

In addition, as has been described above, where the kneading is carried out in the atmosphere or a prepared composition is exposed to the atmosphere, moisture is supplied from the atmosphere and, therefore, a positive addition of water is not necessary. Furthermore, where the inorganic filler such as carbon black contains a predetermined amount of moisture, the means of moistening such as exposure to air is not needed, either.

In general, the curable composition according to the present invention is preferably formulated in the form as follows: the component (A) is contained in one pack and the components (B) and (C) in another pack, with the components (D) to (F) being contained in a mixed state in either one of the two packs, and the contents of the two packs are mixed with each other at the time of actual use of the composition. In this case, the part of the composition which contains the components (D) to (F) in a mixed state, before mixing with the other part, already has an improved fluidity showing the remarkable advantage of the present invention.

The curable composition of the present invention obtained as above can be heat cured by the same methods as used for ordinary addition-curable type silicone rubber compositions, for example, press-curing, coating forming, potting forming and the like. The compositions according to the present invention are suitable for use as potting material, PPC roll material, coating material, adhesive, etc., excellent in such properties as heat resistance, electrical insulation properties, thermal conductivity and so on.

EXAMPLES

In the following examples, viscosity is given in values measured at 25° C., Me stands for the methyl group, and "part(s)" means "part(s) by weight".

Example 1

A universal agitator was charged with 100 parts of a dimethylpolysiloxane (component (A)) having the following formula:

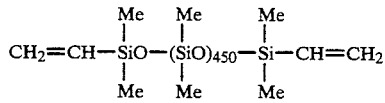

and a viscosity of 5,000 cP and 16 parts of a carbon black (component (C)) having an average particle diameter of 53 μm, a specific surface area of 32 m²/g and a water content of 0.05%, followed by agitation to obtain a uniform mixture. Then, 0.5 part of tetraethyl titanate (component (E)) was added, and agitation was continued further, to prepare a mixture. The mixture exhibited fluidity after the lapse of 60 minutes from the addition of tetraethyl titanate. The viscosity of the mixture at this stage was measured on a Brookfield viscometer, with rotation speed varied. The results are given in Table 1 below.

To 116 parts of the mixture, were added 2.8 parts of a methylhydrogenpolysiloxane (component (B)) having the following formula:

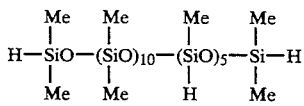

and a viscosity of 13 cP and 60 ppm (in terms of platinum atoms) of a chloroplatinic acid-vinylsiloxane complex (component (C)), followed by mixing sufficiently and defoaming, to obtain a curable composition.

The composition thus prepared was cured by heating at 130° C. for 30 minutes, to give a sheet-like shaped product 2 mm in thickness. In accordance with JIS K-6301, specimens were cut from the thus obtained sheet by a dumbbell die, and subjected to measurements of hardness, elongation and tensile strength at an initial stage as well as after held at 300° C. for 7 days, 14 days and 30 days. The results are given in Table 2.

Example 2

A mixture was prepared in the same manner as in Example 1 except that the tetraethyl titanate used in Example 1 was replaced by the same amount of tetrabutyl titanate and 0.4 part of hexamethoxydisiloxane was added simultaneously with the tetrabutyl titanate. The thus prepared mixture showed fluidity after the lapse of 60 minutes from the addition of tetrabutyl titanate.

The viscosity of the mixture at this stage was measured in the same manner as in Example 1. The results are given in Table 1.

Example 3

A mixture was prepared in the same manner as in Example 2 except that the hexamethoxydisiloxane used in Example 2 was replaced by the same amount of an alkoxysilylated allyl isocyanurate having the following formula:

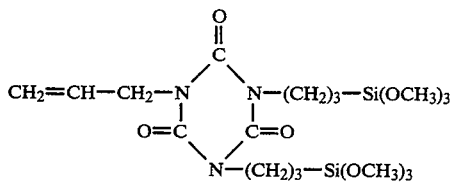

The thus prepared mixture exhibited fluidity after the lapse of 10 minutes from the addition of tetrabutyl titanate.

The viscosity of the mixture at this stage was measured in the same manner as in Example 1. The results are given in Table 1.

Besides, using the mixture, a curable composition was prepared and a heat-cured product of the composition was tested for physical properties, in the same manner as in Example 1. The results are given in Table 2.

Comparative Example 1

Preparation of a mixture and viscosity measurement were carried out in the same manner as in Example 3 except that the agitation steps were carried out entirely in a stream of nitrogen. The results are given in Table 1. The thus prepared mixture showed little fluidity, even after the lapse of 5 hours from the addition of tetrabutyl titanate.

Comparative Example 2

A universal agitator was charged with 100 parts the same dimethylpolysiloxane as used in Example 1, 16 parts of the same carbon black as used in Example 1, 5 parts of hexamethyldisilazane and 1 part of water, followed by agitating sufficiently to obtain a uniform state and then heating at 150° C. for 1 hour. The mixture thus prepared showed fluidity after cooled to normal temperature, but it was strongly thixotropic and could not flow uniformly. The viscosity of the mixture in this stage was measured in the same manner as in Example 1. The results are given in Table 1.

Using the mixture thus obtained, a curable composition was prepared and a heat-cured product of the composition was tested for physical properties, in the same manner as in Example 1. The results are given in Table 2.

TABLE 1

| Rotational frequency | Viscosity of mixture (poises) | | | | |
|---|---|---|---|---|---|
| | Example | | | Comp. Ex. | |
| | 1 | 2 | 3 | 1 | 2 |
| 4 rpm | 700 | 630 | 510 | 12120 | 1800 |
| 10 rpm | 700 | 630 | 510 | 7680 | 900 |
| 20 rpm | 700 | 630 | 510 | 4640 | 630 |

TABLE 2

| Physical properties | Physical properties of cured product | | |
|---|---|---|---|
| | Example 1 | Example 3 | Comp. Ex. 2 |
| Initial: | | | |
| Hardness | 35 | 30 | 30 |
| Elongation (%) | 330 | 270 | 250 |
| Tensile strength (kgf/cm$^2$) | 18 | 24 | 16 |
| After held at 300° C. for 7 days: | | | |
| Hardness | 34 | 30 | 25 |
| Elongation (%) | 270 | 260 | 240 |
| Tensile strength (kgf/cm$^2$) | 24 | 12 | 12 |
| After held at 300° C. for 14 days: | | | |
| Hardness | 42 | 29 | 40 |
| Elongation (%) | 180 | 230 | 150 |
| Tensile strength (kgf/cm$^2$) | 17 | 14 | 11 |
| After held at 300° C. for 30 days: | | | |
| Hardness | 58 | 31 | 52 |
| Elongation (%) | 110 | 160 | 100 |
| Tensile strength (kgf/cm$^2$) | 16 | 18 | 10 |

Note: Hardness measurement was carried out on a Type A spring hardness tester according to JIS K-6301. The same applies hereinafter.

Example 4

One hundred parts of a vinyldimethylsilyl-endblocked dimethylpolysiloxane having a viscosity of 600 cP, 140 parts of a crystalline silica powder (water content: 0.05%) having an average particle diameter of 15 μm, 10 parts of a dimethyldichlorosilane-treated hydrophobic fumed silica (specific surface area: 100 m$^2$/g) and 0.5 part of tetrabutyl titanate were mixed with agitating 1 hour to prepare a mixture.

The viscosity of the mixture was measured on a Type BH Brookfield viscometer (at rotation speed of 7 rpm), immediately upon the mixing with agitation and after 24 hours. The results are given in Table 3.

To 250 parts of the mixture thus obtained were added 3 parts of a hydrogenmethylpolysiloxane having the following formula:

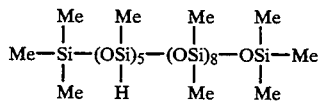

0.5 part of 1,3,5,7-tetravinyl-1,3,5,7-tetramethylcyclotetrasiloxane, and 50 ppm (in terms of platinum atoms) of a platinum-vinylsiloxane complex, followed by mixing sufficiently to obtain a uniform state, thereby preparing a curable composition.

After the thus prepared composition was left to stand at 25° C. for 1 week, the composition was visually examined for separation of oil and filler from each other. Besides, the composition was cured at 120° C. for 30 minutes, and the resulting cured product was subjected to measurements of mechanical properties according to JIS K-6301. The results are given in Table 3.

Comparative Example 3

Preparation of a mixture and viscosity measurement were carried out in the same manner as in Example 4 except that tetrabutyl titanate was not used. The results are given in Table 3.

Further, in the same manner as in Example 4, a curable composition was prepared from the thus obtained mixture, and examination of filler separation and measurements of mechanical properties of a cured product were carried out. The results are given in Table 3.

TABLE 3

|  | Example 4 | Comp. Ex. 3 |
|---|---|---|
| Viscosity (Brookfield viscometer, 10 rpm) (poises): | | |
| Immediately after mixing | 250 | 1800 |
| After 24 hours | 220 | 1200 |
| Oil separation: | Not found | A layer of only silicone oil was recognized as supernatent. |
| Properties after cure: | | |
| Specific gravity (25° C.) | 1.54 | 1.54 |
| Hardness | 65 | 67 |
| Elongation (%) | 110 | 100 |
| Tensile strength (kgf/cm²) | 45 | 42 |

Example 5

One hundred parts of a vinyldimethylsilyl-endblocked dimethylpolysiloxane having a viscosity of 600 cP, 250 parts of a spherical alumina powder (water content: 0.07%) having an average particle diameter of 15 μm, 50 parts of an irregularly shaped alumina powder having an average particle diameter of 3 μm, 1 part of a dimethyldichlorosilane-treated hydrophobic fumed silica (specific surface are: 100 m²/g) and 0.5 part of tetraoctyl titanate were mixed with agitating for 1 hour, to prepare a mixture.

The viscosity of the mixture was measured in the same manner as in Example 4. The viscosity was 150 poises immediately after the mixing, and 140 poises after 24 hours.

Besides, using a centrifugal separator produced by Kokusan Enshinki K.K., the mixture obtained as above was centrifuged at 2,000 rpm for 4 hours, and then visually examined for separation of oil. No separation was recognized.

Example 6

Preparation of a Composition (a) Not Comprising an SiH-Containing Siloxane

One hundred parts of vinyldimethylsilyl-endblocked dimethylpolysiloxane having a viscosity of 30,000 cP, 90 parts of a crystalline silica powder having an average particle diameter of 15 μm (water content: 0.05%), 1.5 parts of dimethyldichlorosilane-treated hydrophobic fumed silica (specific surface area: 100 m²/g), 50 ppm (in terms of platinum atoms) of a platinum-vinylsiloxane complex, and 0.03 part of tetraethyl titanate were mixed with agitating for 1 hour. Then, the filler in the thus mixed composition was dispersed uniformly by a paint roll.

Preparation of a Composition (b) Comprising an SiH-Containing Siloxane

One hundred parts of a vinyldimethylsilyl-endblocked dimethylpolysiloxane having a viscosity of 30,000 cP, 90 parts of a crystalline silica powder having an average particle diameter of 15 μm (water content: 0.05%), 1.5 parts of a dimethyldichlorosilane-treated hydrophobic fumed silica (specific surface area: 100 m²/g), and 0.03 part of tetraethyl titanate were mixed with agitating for 1 hour. To the mixture thus obtained, 2 parts of a hydrogenmethylpolysiloxane having the following formula:

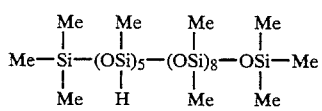

and 0.5 part of 1,3,5,7-tetravinyl-1,3,5,7-tetramethylcyclotetrasiloxane were added, followed by mixing sufficiently to obtain a uniform composition. Then, the filler in the composition was dispersed uniformly by a paint roll.

The viscosity of the composition was measured on a Type BH Brookfield viscometer at a rotation speed of 10 rpm. Besides, the composition was treated by a centrifugal separator produced by Kokusan Enshinki K.K. at a rotation speed of 2,000 rpm for 4 hours, and then visually examined for separation of oil.

Furthermore, using a liquid injection molding machine produced by Yamashiro Seiki K.K. and making such an adjustment that the above two compositions (a) and (b) were mixed in a 1:1 ratio, a sheet measuring 150×150×2 mm was molded under the conditions of an injection pressure of 90 kgf/cm², an injection time of 5 sec, and a curing at 150° C. for 40 sec. The sheet thus obtained was tested for mechanical properties according to JIS K-6301. In addition, filler separation in the molded product was evaluated by visual examination of mottles in the vicinity of the gate of the injection molding machine.

The results are given in Table 4.

Comparative Example 4

Preparation of two compositions and tests were carried out in the same manner as in Example 6 except for omitting the tetraethyl titanate. The results are given in Table 4.

TABLE 4

|  | Example 6 | | Comp. Ex. 4 | |
|---|---|---|---|---|
|  | (a) | (b) | (a) | (b) |
| Before cure: | | | | |
| Viscosity (poises) | 1000 | 1000 | 1500 | 1500 |
| Separation (after centrifuged) | Not found | Not found | Found | Found |
| After cure: | | | | |
| Specific gravity (25° C.) | 1.40 | | 1.40 | |
| Hardness | 40 | | 40 | |
| Tensile strength (kgf/cm²) | 30 | | 32 | |
| Elongation (%) | 250 | | 240 | |
| Separation (mottles) | Not found | | Found | |

We claim:

1. A silicone rubber composition comprising:
(A) an alkenyl group-containing organopolysiloxane, (B) an organohydrogenpolysiloxane having at least two silicon-bonded hydrogen atoms in its molecule, (C) a platinum group metal catalyst, (D) an inorganic filler, (E) an organic titanium compound selected from the group consisting of titanic acid esters and silicic acid esters of titanium, and (F) water, wherein said organohydrogenpolysiloxane (B) is compounded in an amount such that the amount of said silicon-bonded hydrogen atoms is from 0.4 to 5.0 moles per mole of alkenyl groups in said organopolysiloxane (A).

2. The composition of claim 1, wherein said organic titanium compound of component (E) is compounded in an amount of from 0,001 to 5 parts by weight per 100 parts by weight of said component (A).

3. The composition of claim 1, wherein said organic titanium compound is a tetraalkyl titanate.

4. The composition of claim 3, wherein said tetraalkyl titanate is tetraethyl titanate, tetrabutyl titanate or tetraoctyl titanate.

5. The composition of claim 1, wherein said water of component (F) is compounded in an amount of from 0.1 to 5% by weight based on the amount of said inorganic filler of component (D).

6. The composition of claim 1, wherein said inorganic filler of component (D) comprises carbon black.

7. The composition of claim 6, wherein said carbon black is compounded in an amount of from 5 to 50 parts weight per 100 parts by weight of said alkenyl group-containing organopolysiloxane of component (A).

8. The composition of claim 6, further comprising an organosilicon compound containing at least one silicon-bonded alkoxyl group in its molecule.

9. The composition of claim 1, wherein said inorganic filler of component (D) comprises a silica or alumina having an average particle diameter of 1 $\mu$m or above and a fumed silica or precipitated silica having a specific surface area of 50 $m^2$/g or above.

10. The composition of claim 9, wherein said fumed silica or precipitated silica is used in an amount of up to 20% by weight based on the total amount of said silica or alumina having an average particle diameter of 1 $\mu$m or above.

11. The composition of claim 10, wherein said inorganic filler is compounded in an amount of from 10 to 500 parts by weight per 100 parts by weight of said alkenyl group-containing organopolysiloxane of component (A).

* * * * *